Patented Oct. 18, 1938

2,133,483

UNITED STATES PATENT OFFICE 2,133,483

METHOD FOR DETECTING ICE FORMATION

Thomas M. Shaw, Washington, D. C., and Lyle T. Alexander, Berwyn, Md.; dedicated to the free use of the Public No Drawing. Application January 18, 1937, Serial No. 121,162

5 Claims. (Cl. 175—183)

(Granted under the act of March 3, 1883, as amended April 30, 1928; 370 O. G. 757)

This application is made under the act of March 3, 1883, as amended by the act of April 30, 1928, and the invention may be manufactured and used by or for the Government for governmental purposes without the payment to us of any royalty thereon.

We hereby dedicate the invention herein described to the free use of the public.

Our invention relates to a capacitance method for measuring the freezing point of water in various materials, and determining the quantity of ice formed in these materials at various temperatures.

The object of our invention is to provide a method for measuring the freezing point of water in various materials under conditions of thermal equilibrium. Our invention has the additional objective of providing a means of studying the relation between the temperature and quantity of ice formed in various materials at temperatures below the initial freezing point of the water they contain.

In the past, measurements of freezing points of water in various materials, especially those of colloidal nature, have been made by methods which did not permit the establishment of thermal equilibrium. These measurements have depended upon the thermal arrest which occurs in the material upon the initiation of ice formation in the supercooled material. The freezing temperature so obtained depended, to some extent, on the degree of supercooling, the nature of thermal looses of the system and nature of the material. In the case of pure water, the value obtained was essentially correct; however, in case of any material in which there occurs a change in concentration of the water solution remaining unfrozen, the temperature arrived at by these methods is not the true freezing temperature.

The determination of the relation between freezing temperatures and the amount of ice formed in various materials has, in the past, been made by dilatometric methods. This method depends upon the volume change which takes place in the water when it is converted from liquid to solid. This volume is measured by determining the expansion of the contents of a closed vessel which contains the material to be studied immersed in suitable, nonreacting liquid. The measurements do not take into consideration the probable effect produced by the compression of the material by the expansion of the water when it freezes. Furthermore, it is not accurately known what the density of the water in the material is either before or after freezing.

Interpretation of the data obtained from the freezing point measuraments depends, in a large measure, for its usefulness upon the assumption that the measurements have been made under conditions of thermal equilibrium. It has long been recognized that these measurements were not made under thermal equilibrium conditions, and attempts have been made to correct the data so obtained.

It is desirable that a method be available for making freezing point measurements under thermal equilibrium conditions, not only for making the determinations themselves, but also to determine how great were the errors introduced by the older methods.

Our invention makes possible the measurement of freezing temperatures of water in various materials, and also permits the determination of the relationship between quantity of ice formed and freezing temperature for these various materials by utilizing the great change which occurs in the dielectric constant of water when it is converted from liquid to solid or vice versa. The material to be studied is made a part of the dielectric of an electric condenser. When the temperature is lowered and ice is formed in the material a change occurs in the capacitance of the condenser. This change in the capacitance of the condenser is used to locate the temperature at which ice is initially formed. Further formation of ice at temperatures below the freezing temperature is indicated by further change in the capacitance of the condenser. Hence, a determination may be made not only of the highest temperature at which ice is formed (the freezing point) but also of the relationship between temperature and the amount of ice formed at temperatures below the initial freezing temperature.

The material to be studied is made a portion of the dielectric of an electric condenser. There are several types of condensers known to the art which can be used.

For materials which have an appreciable conductivity we prefer to use a condenser which has a layer of nonconducting material, such as glass, between the plates and material to be studied. The condenser containing the material is placed in a thermostat which is so constructed that its temperature can be controlled accurately from temperatures above the freezing temperature of the water to temperatures well below the freezing point of this water. If the freezing point is desired, a series of measurements of the capacitance of the condenser containing the material to be studied are made at successively lower temperatures, starting at some temperature above the freezing point and continuing to some point below the freezing point.

The condenser containing the material is allowed to come to thermal equilibrium at each temperature employed and then its capacity measured. This measurement of capacitance may be made by any of the well known apparatus in the art.

In carrying out our method we prefer to use a resonance apparatus employing oscillations of about 1800 kilocycles, although any reasonably short wave length may be used. It is known that if one employs oscillations of very long wave lengths for measuring the dielectric constant, then ice and liquid water have essentially the same dielectric constant and therefore the method would not detect the transition point. When the data have been obtained a graph is made, plotting the relation between capacitance of the condenser and temperature. The freezing point is indicated by a break in the curve at which the capacitance begins to change rapidly as a function of temperature.

This method presumes that there is no discontinuity in the relationship between dielectric constant and temperature for the other components of the dielectric of the condenser over the range of temperature employed. This is true for the materials on which we have made these determinations. We have used the method successfully on the following materials: water, sucrose in water, soil, soil colloid, clover leaves, green peas, potato tubers, sweetpotato leaves.

It is obvious that by the reversal of the above procedure, that is, taking measurements at successively higher temperatures, starting with the frozen material, one obtains the melting point of the water in the material. In case of materials from which ice separates as a pure phase and leaves the unfrozen water with a freezing point lower than that initially obtained, as for example, sugar solution, or plant sap, the shape of the capacitance-temperature curve shows the relationship between amount of water separated as ice and that remaining unfrozen since the capacity of the condenser changes with each increment of water which changes from liquid water to ice, or from ice to liquid water.

Our invention has also been used to determine the time required to completely freeze materials such as green peas by noting the time elapsed after lowering the temperature below the freezing point, before the condenser containing the material shows a constant capacitance. This gives the time required since the capacitance necessarily changes as long as ice is forming.

Having thus described our invention, what we claim for Letters Patent is:

1. The method of determining the temperature of ice formation in various materials by determining their dielectric constant as a function of decreasing temperature of the material, noting the temperature at which the dielectric constant changes due to formation of ice.

2. The method of determining the temperature at which ice in various materials melts by determining their dielectric constant as a function of increasing temperature of the material, noting the temperature at which the dielectric constant changes due to the change of state of the ice.

3. The method of determining the temperature of ice formation in various materials by making them a portion of the dielectric of an electric condenser, measuring the electrical capacitance of said condenser as a function of decreasing temperature of the material, noting the temperature at which the electrical capacitance changes due to formation of ice.

4. The method of determining the temperature at which the ice in various materials melts by making them a portion of the dielectric of an electric condenser, measuring the electrical capacitance of said condenser as a function of increasing temperature of the material, noting the temperature at which the electrical capacitance changes due to change of state of the ice.

5. The method of determining the time required for the ice in a given material to melt by measuring the dielectric constant of the material being thawed as a function of time, noting the time required for the dielectric constant to attain a constant value.

THOMAS M. SHAW.
LYLE T. ALEXANDER.